(12) United States Patent
Sumser et al.

(10) Patent No.: US 7,506,508 B2
(45) Date of Patent: Mar. 24, 2009

(54) COMPRESSOR IN AN EXHAUST GAS TURBOCHARGER OF AN INTERNAL COMBUSTION ENGINE AND METHOD FOR OPERATING THE COMPRESSOR

(75) Inventors: Siegfried Sumser, Stuttgart (DE); Peter Fledersbacher, Stuttgart (DE); Klaus Roessler, Kernen (DE)

(73) Assignee: Daimler AG, Stuttgart (DE)

( * ) Notice: Subject to any disclaimer, the term of this patent is extended or adjusted under 35 U.S.C. 154(b) by 152 days.

(21) Appl. No.: 11/656,020

(22) Filed: Jan. 19, 2007

(65) Prior Publication Data

US 2007/0144172 A1      Jun. 28, 2007

Related U.S. Application Data

(63) Continuation-in-part of application No. PCT/EP2005/007161, filed on Jul. 2, 2005.

(30) Foreign Application Priority Data

Jul. 20, 2004  (DE)  ........................ 10 2004 035 044

(51) Int. Cl.
| | |
|---|---|
| F02B 33/44 | (2006.01) |
| F02B 37/00 | (2006.01) |
| F02B 37/013 | (2006.01) |
| F02B 37/04 | (2006.01) |
| F04D 25/04 | (2006.01) |
| F04D 27/00 | (2006.01) |
| F01D 17/14 | (2006.01) |
| F16D 27/00 | (2006.01) |
| F02C 6/12 | (2006.01) |

(52) U.S. Cl. ...................... 60/605.1; 415/158
(58) Field of Classification Search ................ 60/605.1; 415/158–160
See application file for complete search history.

(56) References Cited

U.S. PATENT DOCUMENTS

| 4,005,572 | A   | * | 2/1977  | Giffhorn ..................... 415/117 |
|-----------|-----|---|---------|---------------------------------------|
| 4,830,584 | A   | * | 5/1989  | Mohn ....................... 415/182.1 |
| 6,224,333 | B1  | * | 5/2001  | Loeffler et al. ............. 415/158 |
| 6,481,205 | B2  | * | 11/2002 | Fledersbacher et al. .... 60/605.1 |
| 6,571,558 | B2  | * | 6/2003  | Finger et al. ............... 60/605.1 |
| 6,634,174 | B2  | * | 10/2003 | Sumser et al. ................ 60/611 |
| 7,127,893 | B2  | * | 10/2006 | Schmid et al. ............. 415/158 |
| 7,272,929 | B2  | * | 9/2007  | Leavesley ................... 415/158 |
| 7,350,356 | B2  | * | 4/2008  | Sumser et al. ............. 60/605.1 |
| 2007/0125082 | A1 | * | 6/2007 | Sumser et al. ............. 60/605.1 |

FOREIGN PATENT DOCUMENTS

DE        10040122 A1 *  2/2002

(Continued)

*Primary Examiner*—Thai-Ba Trieu
(74) *Attorney, Agent, or Firm*—Klaus J. Bach

(57) ABSTRACT

In a compressor of an exhaust gas turbocharger for an internal combustion engine including a compressor wheel which is rotatably mounted in a compressor inlet duct and an auxiliary rotor wheel arranged so as to be movable axially between a coupled position in engagement with the compressor wheel and a decoupled position, disengaged from the compressor wheel, an adjustable guide vane structure is provided which is movable by an adjusting element together with the auxiliary rotor wheel and a contoured flow control ring for controlling the combustion air flow to the compressor wheel and to the auxiliary rotor wheel.

12 Claims, 5 Drawing Sheets

FOREIGN PATENT DOCUMENTS

| | | | |
|---|---|---|---|
| DE | 10049198 A1 | * | 4/2002 |
| DE | 10050161 A1 | * | 4/2002 |
| DE | 100 61 847 | | 6/2002 |
| DE | 102004003210 A1 | * | 8/2005 |
| DE | 102004003211 A1 | * | 8/2005 |
| EP | 1 394 363 | | 3/2004 |
| JP | 10339152 A | * | 12/1998 |
| WO | WO 2006/007888 A1 | * | 1/2006 |

* cited by examiner

COMPRESSOR IN AN EXHAUST GAS TURBOCHARGER OF AN INTERNAL COMBUSTION ENGINE AND METHOD FOR OPERATING THE COMPRESSOR

This is a Continuation-In-Part Application of pending international patent application PCT/EP2005/007161 filed Jul. 2, 2005 and claiming the priority of German patent application 10 2004 035 044.2 filed Jul. 2, 2004.

BACKGROUND OF THE INVENTION

The invention relates to a compressor in an exhaust gas turbocharger for an internal combustion engine wherein the compressor includes a compressor wheel and adjacent the compressor wheel, an auxiliary rotor wheel which is axially movable and can be coupled to the compressor wheel for rotation therewith, and to a method for operating such a compressor.

DE 100 61 847 A1 describes an exhaust gas turbocharger for an internal combustion engine, which exhaust gas turbocharger has an exhaust gas turbine arranged in the exhaust system of the internal combustion engine and has a compressor arranged in the intake tract, with an auxiliary rotor wheel being mounted in the compressor inlet duct upstream of the compressor wheel of the compressor, the auxiliary rotor wheel being separate from, and arranged coaxially with respect to the compressor wheel. The auxiliary rotor wheel is intended to positively influence the operating behavior of the compressor since the surge limit of the compressor is moved in the direction of lower volume flow rates and the choke limit is moved in the direction of higher volume flow rates. The auxiliary rotor wheel, which rotates independently of the compressor wheel, is driven by an electric motor.

It is known from the document DE 100 49 198 A1 to arrange an adjustable blocking element in the inlet duct of a compressor, upstream of the compressor wheel, for variably adjusting the effective cross section of the inlet duct. This design offers the advantage that the cross-section of the compressor inlet duct is variably adjustable, likewise making it possible to manipulate the operating behavior of the compressor. It is for example possible in particular to influence the flow speed and the angular momentum of the supplied combustion air, for example to increase the flow inlet speed of the supplied air by means of a constriction of the cross section. At low loads and speeds, the compressor can be used as an air-driven turbine (so-called cold air turbine mode) utilizing a pressure drop across the compressor to drive the compressor wheel. This pressure drop corresponds to a throttle action in the intake tract, which offers the advantage that the internal combustion engine can be fundamentally operated without a throttle flap. A further advantage is that the charger speed can be kept at a minimum level even at low loads and speeds of the internal combustion engine.

An exhaust gas turbocharger for an internal combustion engine is known from DE 100 50 161 Al, the compressor of which is arranged in the intake tract of the internal combustion engine and is driven by the exhaust gas turbine. A compressor wheel which, when driven, sucks combustion air from the atmosphere and compresses it to an increased charge pressure is rotatably mounted in the compressor inlet duct which is formed in the compressor housing. In order to increase efficiency in particular in low load and speed ranges, it is possible to activate an electric motor comprising a rotor, which rotor is mounted coaxially with respect to the compressor wheel, upstream in the compressor inlet duct, and a stator which is fixed to the housing. Additional combustion air is sucked in by the rotor, which rotates independently of the compressor wheel, when the electric motor is activated. The rotor of the electric motor can also be moved into a coupled position in which it is connected in a positively locking fashion to the compressor wheel, so that the compressor wheel is also driven when the electric motor is activated.

It is the object of the present invention to improve the operating behavior of an exhaust gas turbocharger of an internal combustion engine, in particular for providing a fast charge air pressure build-up during low loads and low engine speeds.

SUMMARY OF THE INVENTION

In a compressor of an exhaust gas turbocharger for an internal combustion engine including a compressor wheel which is rotatably mounted in a compressor inlet duct and an auxiliary rotor wheel arranged so as to be movable axially between a coupled position in engagement with the compressor wheel and a decoupled position, disengaged from the compressor wheel, an adjustable guide vane structure is provided which is movable by an adjusting element together with the auxiliary rotor wheel and a contoured flow control ring for controlling the combustion air flow to the compressor wheel and to the auxiliary rotor wheel.

The auxiliary rotor wheel can be equipped with a turbine-wheel-like blade arrangement and can also, without external drive, generate an additional drive momentum by means of the introduced combustion air. The angular drive momentum is transmitted also to the compressor wheel as a result of the kinematic coupling. A comparatively high speed level of the rotor of the exhaust gas turbocharger is reached in this way and the charge pressure build-up is positively influenced in particular at low loads and engine speeds, thus improving the transient behavior of the internal combustion engine. In contrast, at relatively high loads and speeds, the auxiliary rotor wheel is decoupled from the compressor wheel, so that the combustion air impinges directly on the compressor wheel without any restriction in the flow path.

The auxiliary rotor wheel also serves to expand the compressor characteristic diagram for the benefit of higher choke limits and lower surge limits.

A significant increase in the drive torque can be obtained in that an adjustable guide vane structure is arranged in the region of the inlet flow cross section of the auxiliary rotor wheel, by means of which the effective inlet flow cross-section for the auxiliary rotor wheel can be variably adjusted. The guide vane structure separates the inlet flow side from the exit flow side of the auxiliary rotor wheel. By means of a corresponding adjustment of the guide vane structure, in particular by moving the guide vane structure into the blocking position, which minimizes the effective cross-section, a high pressure drop is obtained, which is favorable for the airflow between the inlet flow side and the exit flow side of the auxiliary rotor wheel. The combustion air flowing through the blade arrangement of the guide vane structure is at a high flow speed, so that the air impinging on the blade arrangement of the auxiliary rotor wheel imparts an angular drive momentum to the latter. The auxiliary rotor wheel and therefore also the compressor wheel coupled to the auxiliary rotor wheel are thereupon accelerated or held at a relatively high speed level.

The auxiliary rotor wheel is expediently a turbine wheel to which the combustion air flow is admitted in particular radially. The combustion air is expanded as it passes through the turbine wheel to the compressor, and leaves the turbine wheel axially. In the further course of the flow, the expanded air impinges on the compressor wheel at the axial end side thereof, is compressed by the compressor wheel and is discharged radially via a diffuser into an accumulating space and is finally supplied to the cylinders of the internal combustion engine. The turbine wheel in the compressor can be designed for very high pressure ratios and low high speed operation with optimum efficiency. The wheel blade arrangement is advantageously designed in the same way as in a mixed-flow turbine, in particular a parallel flow turbine. In the case of a parallel flow turbine, the pressure expansion takes place as the air passes through the guide vane structure, which is mounted upstream, with the high flow speeds driving the turbine. The air flow is subjected to a change in direction as it passes through the turbine wheel. In the inlet region, the turbine blades of the auxiliary rotor wheel are expediently aligned in the reverse direction with respect to the rotational direction, and have a relatively small blade entry angle.

The auxiliary rotor wheel is advantageously mounted in an axially displaceable fashion in the compressor inlet duct and is movable between a coupled position and an uncoupled position by means of an adjusting element. The adjusting element expediently also serves to adjust the guide vane structure which is mounted upstream of the inlet flow side of the auxiliary rotor wheel. It is preferable that, as the auxiliary rotor wheel approaches the compressor wheel, the auxiliary rotor wheel is first moved into the coupled position with the compressor wheel, and subsequently, during a further advancing movement in the direction of the compressor wheel, the guide vane structure is moved from its maximum opening position to its minimum or blocking position. In order to be able to carry out the two movements with only one common adjusting element, firstly, the auxiliary rotor wheel is connected, by means of a spring element, to a coupling element which, in the coupled position, is rotationally fixedly connected to the compressor wheel, with the relative spacing between the coupling element and the auxiliary rotor wheel being reduced counter to the force of the spring element as the compressor wheel is approached. Secondly, the guide vane structure which is mounted upstream is held in a die plate when in the blocking position, with a spring element likewise being arranged between the die plate and the guide vane structure, the spring element acting on the guide vane structure in the direction of the opening position. Both, the auxiliary rotor wheel and the die plate, are adjusted directly by the adjusting element. As the compressor wheel is approached, the relative spacing between the coupling element and the auxiliary rotor wheel is firstly reduced. The guide vane structure is subsequently pushed into the die plate causing the guide vane structure to be moved from the maximum opening position into the minimum or blocking position. The guide vane structure is expediently disposed on a contoured ring which, during a movement of the adjusting element, abuts a duct wall of the compressor inlet duct.

For the coupling between the auxiliary rotor wheel and the compressor wheel, it is fundamentally sufficient for the coupling element to be embodied as a friction cone which, in the coupled position, is in frictional contact with the compressor wheel. The friction between the friction cone and the compressor wheel exceeds the acceleration forces occurring in the peripheral direction between the two components.

If appropriate, however, a positively locking engagement between the auxiliary rotor wheel or coupling element and the compressor wheel would also be suitable.

Further advantages and expedient embodiments will become apparent from the following description of the invention on the basis of the accompanying drawings:

BRIEF DESCRIPTION OF THE DRAWINGS

FIG. 4a shows an enlarged detail of the blade arrangement of the auxiliary rotor wheel, FIG. 4b shows a plan view of the blade arrangement of the auxiliary rotor wheel.

DESCRIPTION OF PREFERRED EMBODIMENTS

In the figures, identical components are provided with the same reference symbols.

Figure 1:
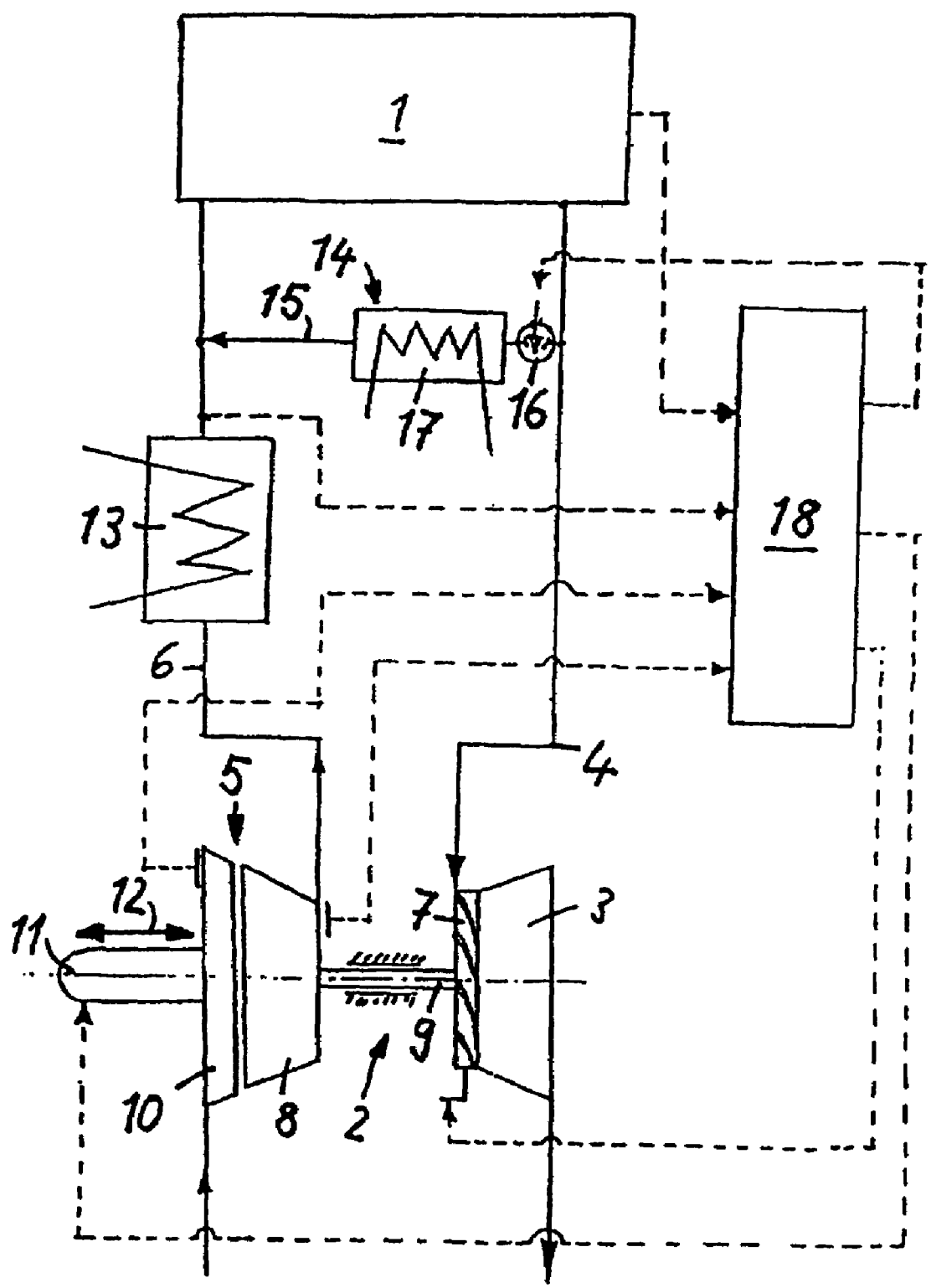
FIG. 1 is a schematic illustration of a charged internal combustion engine, with the compressor in the exhaust gas turbocharger having an axially adjustable auxiliary rotor wheel in addition to the compressor wheel.

The internal combustion engine 1 shown in FIG. 1—a gasoline or a diesel internal combustion engine—including an exhaust gas turbocharger 2 which comprises an exhaust gas turbine 3 disposed in the exhaust system 4 and a compressor 5 in the intake tract 6. During operation of the internal combustion engine, the exhaust gas turbine 3 is driven by the pressurized exhaust gases of the internal combustion engine. The rotation of the turbine wheel is transmitted via a shaft 9 to the compressor wheel 8 in the compressor 5 in which combustion air introduced from the environment is compressed to an increased charge pressure. In the intake tract 6, the compressed air is first cooled in a charge air cooler 13 and is subsequently supplied at charge pressure to the cylinders of the internal combustion engine.

The exhaust gas turbine 3 is equipped with variable turbine geometry 7 for variably adjusting the effective turbine inlet cross section. The behavior of the exhaust gas turbine can be improved both in the powered drive operating mode and also in the engine braking mode by means of the variable turbine geometry 7.

The compressor 5 of the exhaust gas turbocharger 2 has, in addition to the compressor wheel 8, an auxiliary rotor wheel 10 which is mounted axially upstream of the compressor wheel (8). The auxiliary rotor wheel 10 is arranged in an axially movable fashion in the compressor 5. The auxiliary rotor wheel 10 is acted on by an adjusting element 11 and can perform an axial adjusting movement as illustrated by the arrow 12. Here, the auxiliary rotor wheel 10 is to be adjusted between a coupled position, in which the auxiliary rotor wheel and the compressor wheel are kinematically rotationally coupled, and a decoupled position in which the compressor wheel 8 can rotate independently of the auxiliary rotor wheel 10. The function and operation of the compressor 5 is described on the basis of the following figures.

The internal combustion engine 1 is additionally provided with an exhaust gas recirculation device 14 which comprises a recirculation line 15 extending between the exhaust system 4 upstream of the exhaust gas turbine 3 and the in-take tract 6 downstream of the charge air cooler 13. An adjustable recirculation valve 16 and an exhaust gas cooler 17 are arranged in the recirculation line 15. In part-load operation in particular, part of the exhaust gas mass flow is re-circulated via the exhaust gas recirculation device 14 into the intake tract for a reduction of the $NO_x$ emissions of the internal combustion engine.

All the adjustable devices of the internal combustion engine are to be adjusted by means of control and adjustment signals of a closed-loop and open-loop control unit 18 as a function of state variables and operating variables of the internal combustion engine and of the devices. This relates in particular to the variable turbine geometry 7, the adjusting element 11 in the compressor 5 and the recirculation valve 16 in the exhaust gas recirculation device 14.

Figure 2:
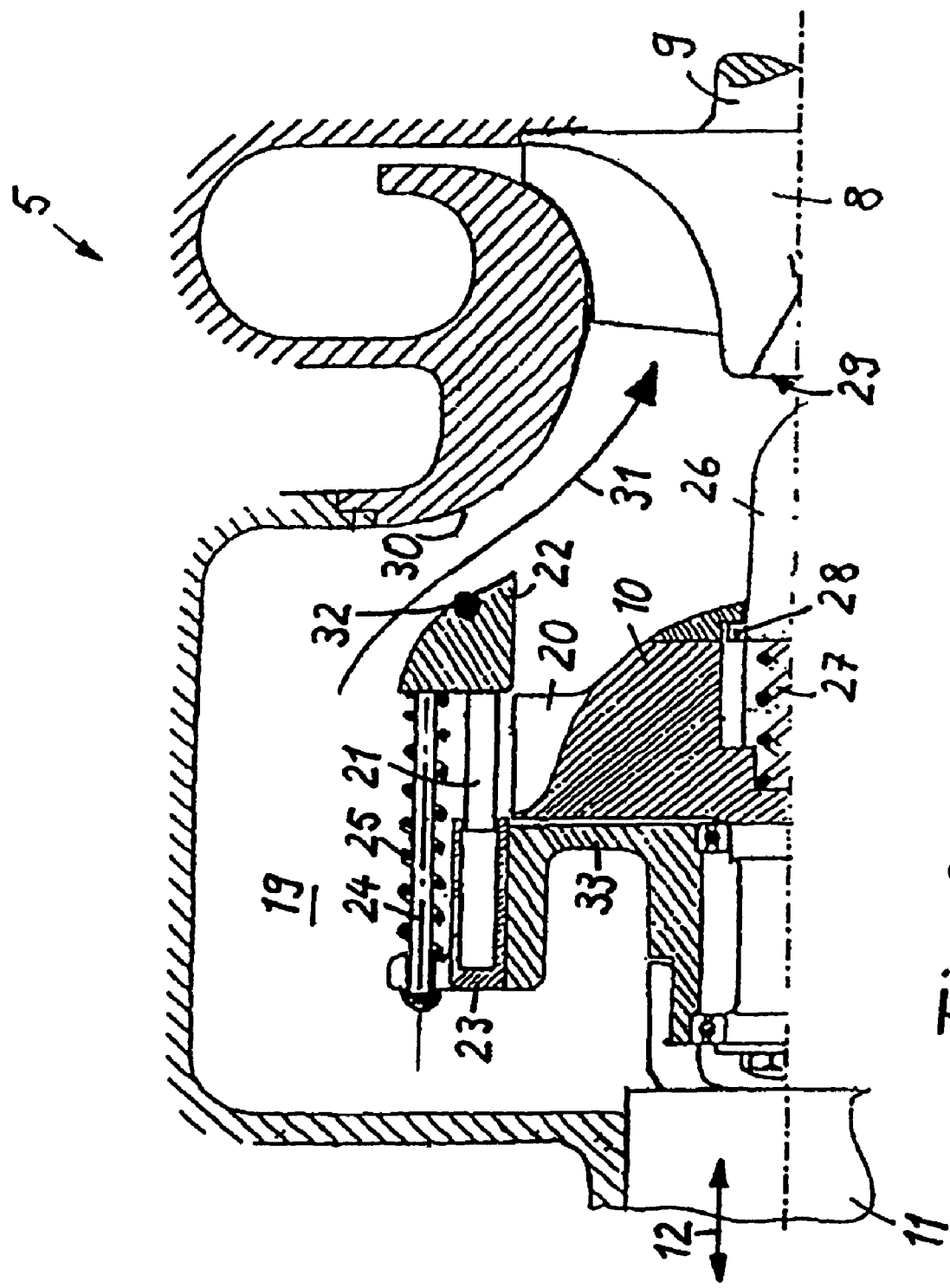
FIG. 2 shows a section through the compressor with the auxiliary rotor wheel in the decoupled position.

As can be seen from the sectioned illustration in FIG. 2, the auxiliary rotor wheel 10 is mounted axially up-stream of the compressor wheel 8 in the compressor inlet duct 19, said auxiliary rotor wheel 10 being retained in an axially displaceable fashion. For this purpose, the auxiliary rotor wheel 10 is coupled to the adjusting element 11 which can be displaced axially as per arrow 12. The auxiliary rotor wheel 10 is to be displaced from the decoupled position illustrated in FIG. 2 into the coupled position with the compressor wheel 8 (FIGS. 3 to 5), in which coupled position the compressor wheel 8 and the auxiliary rotor wheel 10 are rotationally fixedly connected to one another. The coupling is provided by a coupling element 26 which is arranged between the auxiliary rotor wheel 10 and the compressor wheel 8 and is axially captively retained on the auxiliary rotor wheel 10 and so as to be adjustable together with the latter, but can perform an axial relative movement with respect to the auxiliary rotor wheel 10. A spring element 27 is compressed between the coupling element 26 and the auxiliary rotor wheel 10, so as to push the coupling element 26 away from the auxiliary rotor wheel 10. A stop 28 serves to provide for a positive locking engagement between the coupling element 26 and the auxiliary rotor wheel 10, so that both components are captively retained on one another, with the stop 28 simultaneously marking a maximum adjustment position between the two components. In the coupled position, the free end side of the coupling element 26 engages in a rotationally fixed manner into the side wall 29 of the compressor wheel 8. The coupling element 26 is expediently a friction cone, so that the rotational coupling is formed by frictional engagement. The friction force is higher than the forces occurring in the peripheral direction during rotational acceleration.

The auxiliary rotor wheel 10 is designed in the form of a turbine wheel and has radially outwardly extending blades 20 disposed at the inlet end of the auxiliary rotor wheel.

Mounted upstream of the blades 20 of the auxiliary rotor wheel 10 is a radially encompassing guide vane structure 21, which is fixedly supported on a contoured ring 22. The guide vane structure 21 can be inserted into a die plate 23 which is connected to the adjusting element 11. The contoured ring 22 is supported on guide pins 24 which extend axially parallel to the longitudinal axis of the compressor. The guide pins are coupled to the die plate 23 in a captive fashion but are relatively moveable. Compression spring elements 25 are disposed around the guide pins 24, the spring elements 25 being supported at one end on the contoured ring 22 and at the other end on a projection of the die plate 23. The springs 25 bias the contoured ring 22 and the guide vane structure 21 into the maximum opening position of the guide vane structure 21 shown in FIG. 2, wherein the effective inlet cross section through the guide vane structure is at a maximum value.

FIG. 2 illustrates the auxiliary rotor wheel 10 in its decoupled position in which it is not connected to the compressor wheel 8; the coupling element 26 is spaced apart from the end side of the compressor wheel. The decoupled position is actually an inoperative position. The guide grating 21 is also in the decoupled position in the inoperative position.

In the inoperative position, the contoured ring 22 is spaced apart from a housing-side wall 30 providing for a semi-axial flow path in the compressor inlet duct, via which combustion air is supplied in the direction of the arrow 31 directly to the compressor wheel 8 while bypassing the guide vane structure 21 and the auxiliary rotor wheel 10. This operating mode, in which the compressor wheel 8 is driven via the shaft by the turbine wheel of the exhaust gas turbine, is implemented at relatively high engine loads and engine speeds.

At relatively low loads and speeds, the auxiliary rotor wheel 10 is placed into the coupled position with the compressor wheel 8. At the same time, the contoured ring 22 is adjusted into contact with the duct wall 30, with a sealing ring 32 being held in the contoured ring 22 to provide a flow-tight closure as the sealing ring 32 is placed in direct contact with the duct wall 30. The semi-axial flow path is in this case closed, so that the combustion air must travel via the guide vane structure and the auxiliary rotor wheel.

The die plate 23 and the auxiliary rotor wheel 10 are moved by the adjusting element 11 axially in the direction of the arrow 12, with the auxiliary rotor wheel 10 being mounted so as to be rotatable relative to the adjusting element 11 and the guide vane structure 21 and the further associated components. Formed between the rear side of the auxiliary rotor wheel 10 and a wall of a housing section 33, which also supports the die plate 23 and is acted on by the adjusting element 11, is a narrow buffer volume which, in order to prevent lubricating oil from being sucked out, is pressurized with the pressure of the accumulating space in the compressor inlet duct upstream of the auxiliary rotor wheel.

Figure 3:
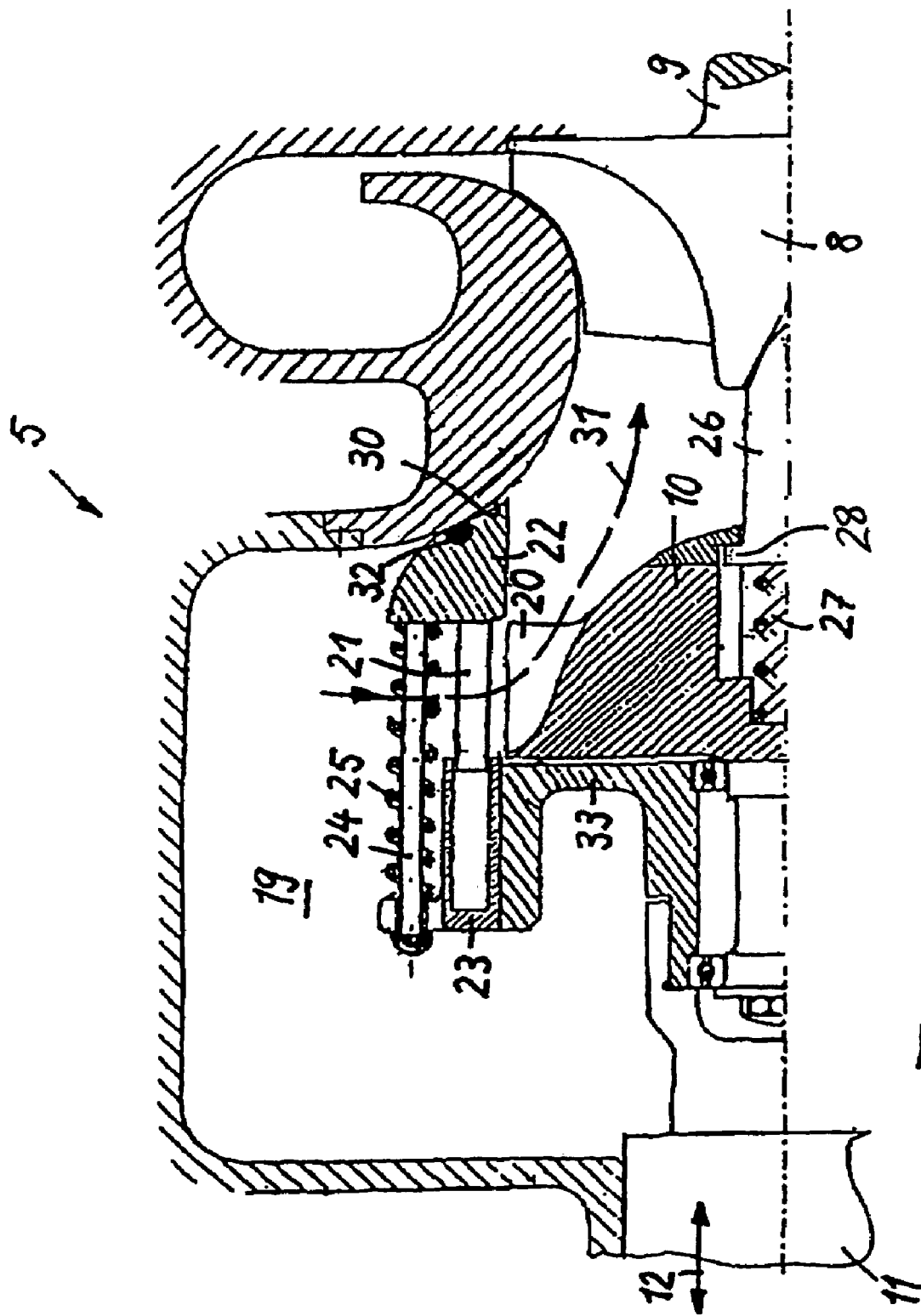
FIG. 3 is an illustration corresponding to FIG. 2, but with the auxiliary rotor wheel in a coupled position and with a guide vane structure, which is mounted upstream, in an operating position with maximum flow passage opening cross-section.

FIG. 3 shows the auxiliary rotor wheel 10 in a position in which it is coupled with the compressor wheel 8, wherein the coupling element 26 is rotationally fixedly engaged with an end area of the compressor wheel 8. In this position also the contoured ring 22 bears with the sealing ring 32 against the duct wall 30, so that this flow path is closed off. At the same time, the guide vane structure 21 is moved farthest out of the die plate 23, which position corresponds to the maximum opening position of the guide vane structure. The flow passes, according to the dashed arrow 31, radially via the guide vane structure 21 to the blades 20 of the auxiliary rotor wheel 10, the latter being driven by the air flowing therethrough as the rotational movement of the auxiliary rotor wheel 10 is transmitted by means of the coupling element 26 to the compressor wheel 8. The auxiliary rotor wheel 10 and the guide vane structure 21 assume this position at low engine loads and mid-range engine speeds. The pressure ratio in the compressor inlet duct up-stream of the guide vane structure 21 to the point down-stream of the auxiliary rotor wheel 10 is at least two, meaning that the pressure upstream of the guide vane structure is at least twice as high as the pressure downstream of the auxiliary rotor wheel 10 in the flow inlet area of the compressor wheel.

Figure 4:
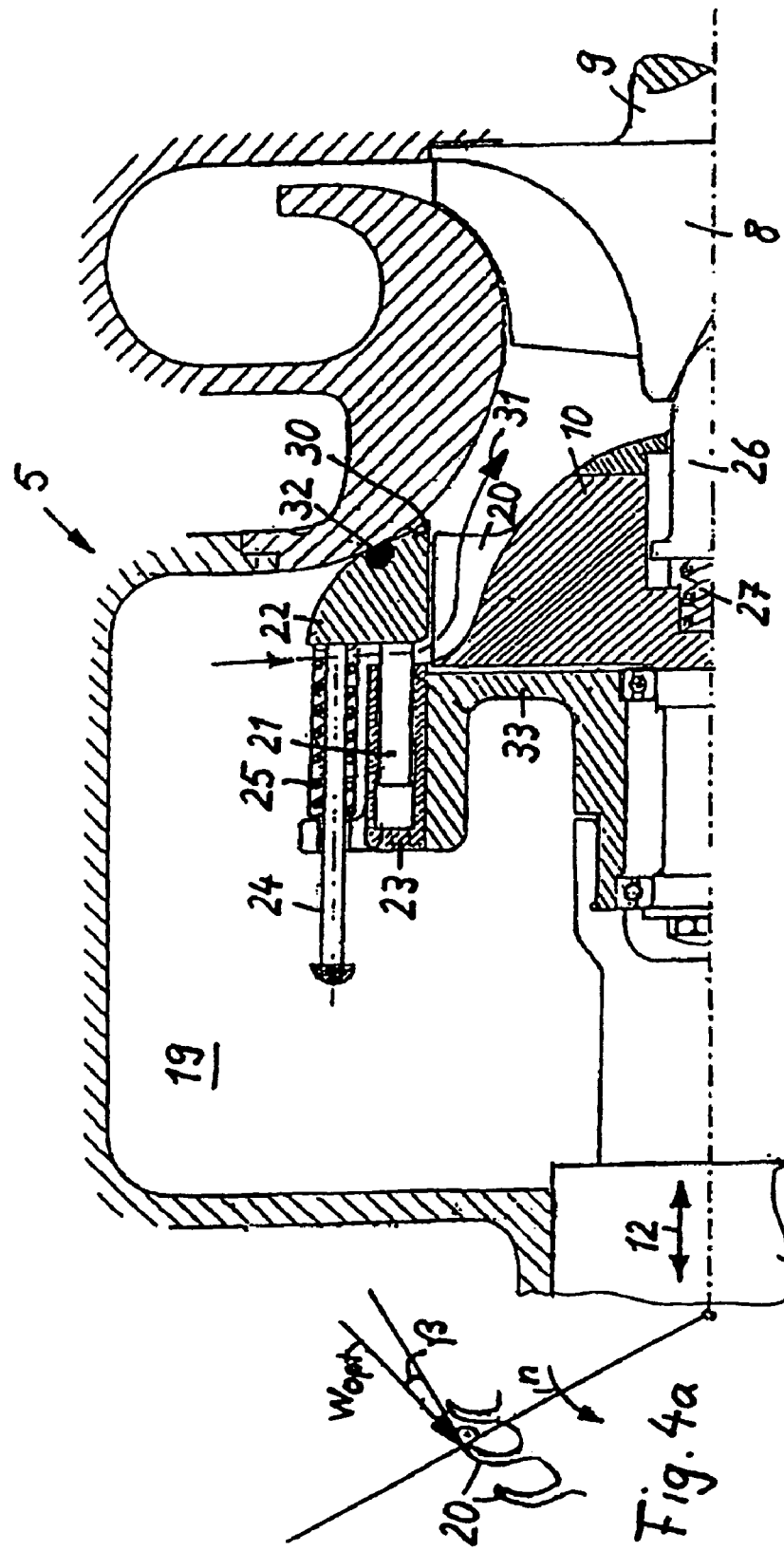
FIG. 4 shows the auxiliary rotor wheel in a position closer still to the compressor wheel, and the guide vane structure in its blocking position which minimizes the inlet flow cross section.

The auxiliary rotor wheel 10 is also in this position coupled with the compressor wheel 8 is shown in the illustration of FIG. 4, with the auxiliary rotor wheel 10 and the coupling element 26 being almost completely pushed together. The contoured ring 22 bears sealingly with the sealing ring 32 against the duct wall 30. Only a narrow axial gap is open through the guide vane structure 21, so that the combustion air flows though the narrow axial gap and impinges radially on the blades 20 of the auxiliary rotor wheel 10. The guide vane structure 21 is pushed to a large extent into the die plate 23 and is therefore in its blocking position which reduces the effective inlet-flow cross section. In this position, an intense pressure drop prevails in the compressor inlet duct 19 between the region upstream of the guide grating 21 and the region downstream of the blades 20 of the auxiliary rotor wheel 10. The pressure ratio is expediently at least 4, meaning that there is at least four times as high a pressure upstream of the guide grating 21 as there is downstream thereof. This operating mode is also referred to as the cold air turbine mode which is implemented close to the engine idle speed.

FIGS. 4a and 4b illustrate the wheel blade arrangement of the auxiliary rotor wheel. As can be seen from FIG. 4a, in the inlet region, the blades 20 are formed so as to be bent backwardly with respect to the rotational direction n with a relatively small blade entry angle β between a tangent to the periphery of the blade arrangement and a flow speed vector $w_{opt}$, the flow speed vector $w_{opt}$ denoting the optimum inlet flow. The blade inlet angle β is, for example, approximately 15°.

It can be seen from FIG. 4b that the blades 20 of the auxiliary rotor wheel are curved in the reverse direction.

Figure 5:
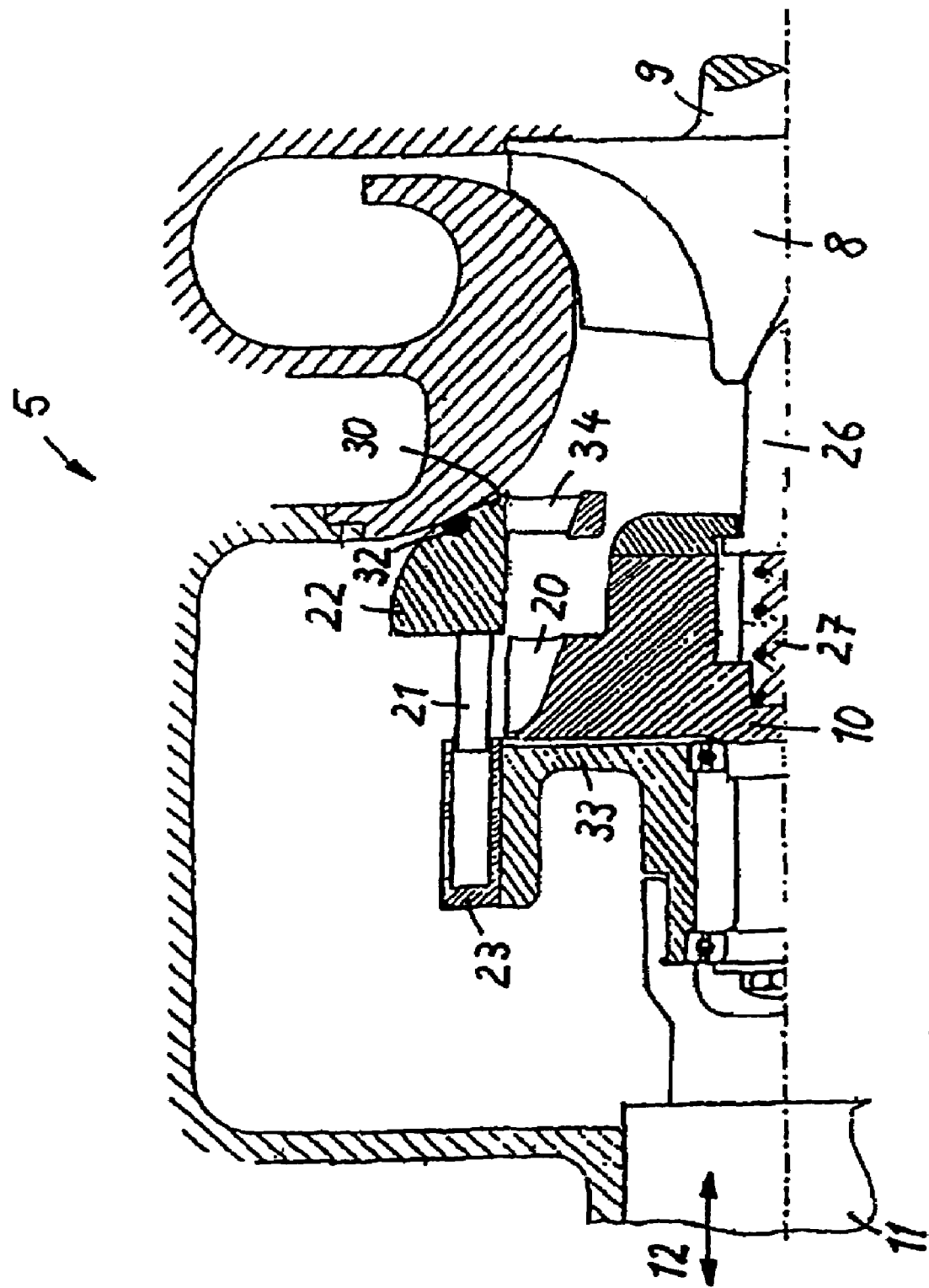
FIG. 5 is a sectional view of an alternative embodiment of the compressor.

FIG. 5 illustrates a modified embodiment of a compressor 5. In contrast to the preceding exemplary embodiment, the compressor according to FIG. 5 has a second guide vane structure 34 which is embodied as a fixed vane structure which is mounted on the contoured ring 22. The first guide vane structure 21, which can be inserted into recesses in the die plate 23, extends parallel to the rotational axis of the compressor, whereas the second guide vane structure 34 extends in the radial direction. The second guide vane structure 34 extends radially inwardly from the contoured ring 22 and faces toward the auxiliary rotor wheel 10. During a closing movement of the adjusting element 11 in the direction toward the compressor wheel 8, the guide vane structure 21 is firstly moved from its opening position into the blocking position. At the same time, the second, fixed guide vane structure 34 and the auxiliary rotor wheel 10 move closer to one another, with the guide vane structure 34 coming into contact with an outer annular shoulder in the axial flow outlet region of the auxiliary rotor wheel 10. Once the first guide vane structure 21 has been moved into its blocking position, the second guide vane structure 34 is also disposed in the flow path of the combustion air passing through the compressor. As it passes through the second guide vane structure 34, the combustion air has an angular momentum imparted to it, with which the air impinges on the blades of the compressor wheel 8. This position is assumed in particular in the low load range in which no charge air pressure is to be generated and the compressor wheel 8 performs the function of a low pressure turbine wheel.

What is claimed is:

1. A method for operating a compressor for an internal combustion engine, the compressor comprising a compressor wheel (8) rotatably supported in an inlet duct (19) of the compressor (5), a coaxial auxiliary rotor wheel (10) arranged in the inlet housing (19) so as to be axially movable between a coupled position with the compressor wheel (8) and a decoupled position, wherein, in the coupled position, the compressor wheel (8) and the auxiliary rotor wheel (10) are rotationally fixedly connected, and, in the decoupled position, the auxiliary rotor wheel (10) is decoupled from the compressor wheel (8), and an adjustable guide vane structure (21) for variably adjusting the effective inlet flow cross section to the auxiliary rotor wheel (10) arranged in the compressor inlet duct (19) upstream of the auxiliary rotor wheel (10), said method comprising the steps of:

at low engine loads and low engine speeds, moving the auxiliary rotor wheel (10) into the coupled position with the compressor wheel (8) and moving the guide vane structure (21) into the blocking position, at low engine loads and mid-range engine speeds, moving the auxiliary rotor wheel (10) into the coupled position with the compressor wheel (8) and moving the guide vane structure (21) into an opening position, and at high engine loads, decoupling the auxiliary rotor wheel (10) from the compressor wheel (8).

2. A compressor in an exhaust gas turbocharger for an internal combustion engine, including a compressor housing with an inlet duct (19), a compressor wheel (8) rotatably supported in the compressor inlet duct (19), an auxiliary rotor wheel (10) disposed in the inlet duct (19) upstream of the compressor wheel (8) and coaxially with the compressor wheel (8), the auxiliary rotor wheel (10) being axially movable between a coupled position with the compressor wheel (8) and a decoupled position, wherein, in the coupled position, the compressor wheel (8) and the auxiliary rotor wheel (10) are rotationally engaged and, in the decoupled position, the auxiliary compressor wheel (10) is decoupled from the compressor wheel (8), an adjustable guide vane structure (21) for variably adjusting the effective inlet flow cross-section to the auxiliary rotor wheel (10) arranged in the compressor inlet duct (19), and a common adjusting element (11) for adjusting the axial position of the auxiliary rotor wheel (10) and the position of the guide vane structure (21).

3. The compressor as claimed in claim 2, wherein the adjusting element (11) is arranged axially displaceably in the compressor inlet duct (19) in axial alignment with the auxiliary rotor wheel (10).

4. The compressor as claimed in claim 3, wherein the auxiliary rotor wheel (10) includes an engagement element (26) which, upon movement of the auxiliary rotor wheel (10) toward the compressor wheel (8) by the adjusting element (11), initially moves the auxiliary rotor wheel (10) from the decoupled position into the coupled position, and subsequently, upon further movement of the auxiliary rotor wheel (10), the vane structure (21) is moved from a maximum opening position to a blocking position.

5. The compressor as claimed in claim 2, wherein the guide vane structure (21) is supported by a contoured ring (22) which is movable into contact with a housing wall section (30) of the compressor inlet duct (19).

6. The compressor as claimed in claim 4, wherein, in the blocking position, the vane structure grating (21) is received in a die plate (23), and a spring element (25) is disposed between the die plate (23) and the guide vane structure (21) for biasing the guide vane structure (21) into the opening position out of the die plate (23).

7. The compressor as claimed in claim 2, wherein a second guide vane structure (34) is provided in the compressor inlet duct (19), the second guide vane structure (34) being arranged between the auxiliary rotor wheel (10) and the compressor wheel (8).

8. The compressor as claimed in claim 5, wherein the second guide vane structure (34) is supported on the contoured ring (22).

9. The compressor as claimed in claim 2, wherein the auxiliary rotor wheel (10) is a turbine wheel with a radial flow inlet.

10. The compressor as claimed in claim 2, wherein the auxiliary rotor wheel (10) includes the coupling element (26) which, in the coupled position, is rotationally fixedly coupled to the compressor wheel (8).

11. The compressor as claimed in claim 10, wherein the coupling element (26) is axially movably supported by the auxiliary rotor wheel (10), and a spring element (27) is arranged between the coupling element (26) and the auxiliary rotor wheel (10) biasing the coupling element (26) toward the compressor wheel (8).

12. The compressor as claimed in claim 11, wherein the coupling element (26) is a friction cone which, in the coupled position, is in frictional contact with the compressor wheel (8).

* * * * *